US007755034B2

(12) United States Patent
Ding

(10) Patent No.: US 7,755,034 B2
(45) Date of Patent: Jul. 13, 2010

(54) ION TRAP AND A METHOD FOR DISSOCIATING IONS IN AN ION TRAP

(75) Inventor: Li Ding, Cheshire (GB)

(73) Assignee: Shimadzu Research Laboratory (Europe) Limited, Manchester (GB)

( * ) Notice: Subject to any disclaimer, the term of this patent is extended or adjusted under 35 U.S.C. 154(b) by 316 days.

(21) Appl. No.: 10/598,185

(22) PCT Filed: Feb. 23, 2005

(86) PCT No.: PCT/GB2005/000676

§ 371 (c)(1), (2), (4) Date: Apr. 20, 2007

(87) PCT Pub. No.: WO2005/083743

PCT Pub. Date: Sep. 9, 2005

(65) Prior Publication Data

US 2008/0035841 A1 Feb. 14, 2008

(30) Foreign Application Priority Data

Feb. 24, 2004 (GB) ................................ 0404106.7

(51) Int. Cl.
*B01D 59/44* (2006.01)

(52) U.S. Cl. ....................... 250/283; 250/281; 250/282; 250/288; 250/290; 250/293

(58) Field of Classification Search .......... 250/281–300
See application file for complete search history.

(56) References Cited

U.S. PATENT DOCUMENTS 5,438,195 A * 8/1995 Franzen et al. .............. 250/292
6,124,592 A * 9/2000 Spangler ..................... 250/287
6,483,109 B1 * 11/2002 Reinhold et al. ............ 250/292

(Continued)

FOREIGN PATENT DOCUMENTS

GB 1346393 2/1974

(Continued)

OTHER PUBLICATIONS

Chinese Office Action dated Dec. 5, 2008, issued in corresponding Chinese Patent Application No. 200580005744.1.

(Continued)

*Primary Examiner*—Bernard E Souw
*Assistant Examiner*—Michael J Logie
(74) *Attorney, Agent, or Firm*—Westerman, Hattori, Daniels & Adrian, LLP

(57) ABSTRACT

A quadrupole ion trap includes a switch 3 for switching a trapping voltage between discrete voltage levels $V_H$, $V_L$. This creates a digital trapping field for trapping precursor ions and product ions in a trapping region of the ion trap. A gating voltage is applied to a gate electrode 12 to control injection of source electrons into the ion trap. Application of the gating voltage is synchronised with the switching so that electrons are injected into the trapping region while the trapping voltage is at a selected one of the voltage levels and can reach the trapping region with a kinetic energy suitable for electron capture dissociation to take place.

23 Claims, 9 Drawing Sheets

U.S. PATENT DOCUMENTS

Figure 1:
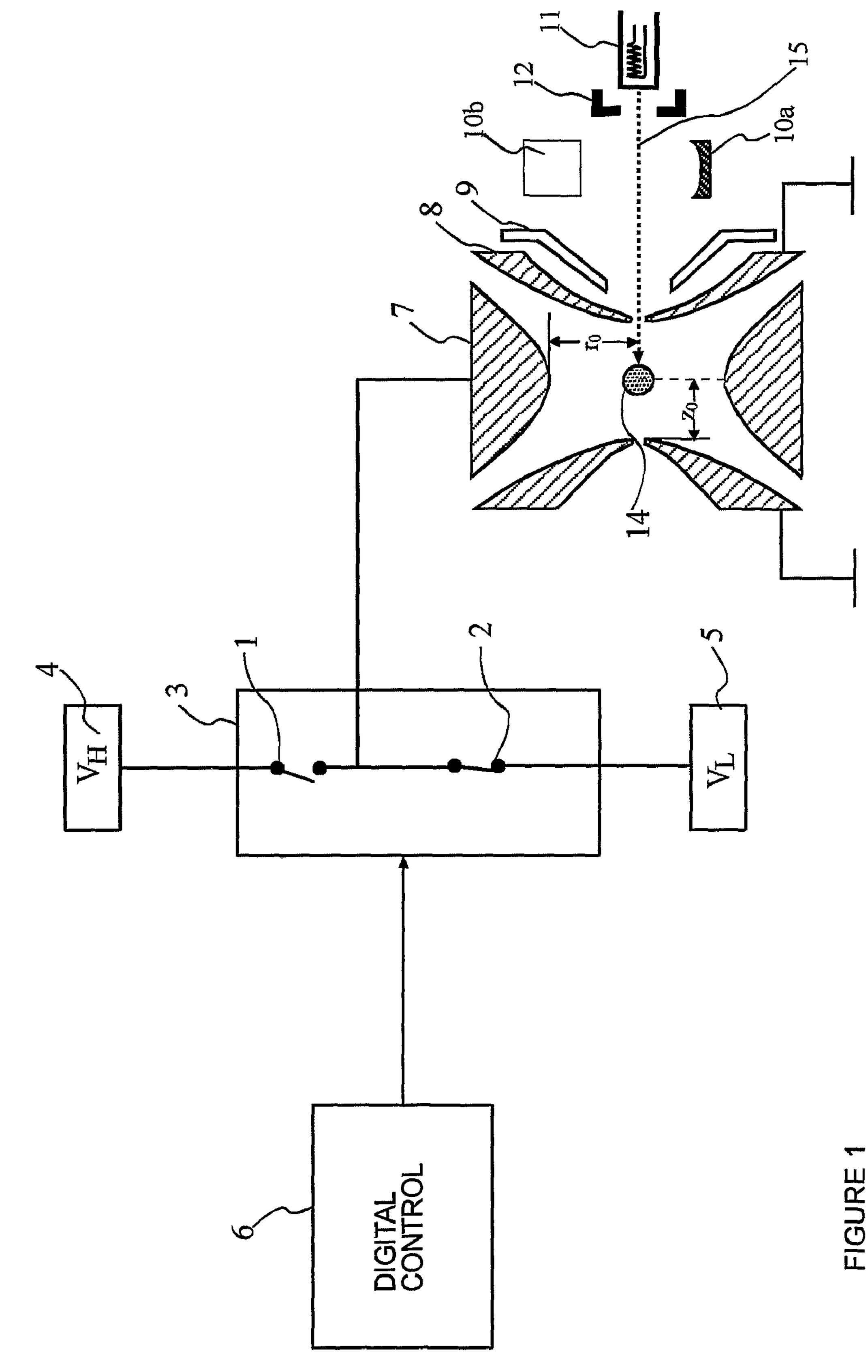

| | | | | |
|---|---|---|---|---|
| 6,653,622 | B2 * | 11/2003 | Franzen | 250/282 |
| 6,800,851 | B1 * | 10/2004 | Zubarev et al. | 250/292 |
| 6,858,840 | B2 * | 2/2005 | Berkout et al. | 250/282 |
| 6,924,478 | B1 * | 8/2005 | Zubarev et al. | 250/282 |
| 6,958,472 | B2 * | 10/2005 | Zubarev | 250/281 |
| 7,193,207 | B1 * | 3/2007 | Ding et al. | 250/292 |
| 7,227,133 | B2 * | 6/2007 | Glish et al. | 250/288 |
| 2002/0092980 | A1 * | 7/2002 | Park | 250/288 |
| 2004/0155180 | A1 * | 8/2004 | Zubarev | 250/281 |
| 2004/0245448 | A1 * | 12/2004 | Glish et al. | 250/281 |
| 2005/0017165 | A1 * | 1/2005 | Franzen | 250/288 |
| 2005/0017167 | A1 * | 1/2005 | Franzen | 250/288 |

FOREIGN PATENT DOCUMENTS

| | | | |
|---|---|---|---|
| JP | 07-085836 | A | 3/1995 |
| JP | 2003-512702 | A | 4/2003 |
| WO | 01/29875 | A2 | 4/2001 |
| WO | 0129875 | A | 4/2001 |
| WO | 02/078048 | A1 | 10/2002 |
| WO | 02078048 | A | 10/2002 |
| WO | 03/102545 | A2 | 12/2003 |
| WO | 03102545 | A | 12/2003 |

OTHER PUBLICATIONS

Syka J E P et al.; "Peptide and Protein Sequence Analysis by Electron Transfer Dissociation Mass Spectrometry", Proceedings of the National Academy of Science of USA, National Academy of Science, Washington, DC, USA, vol. 101, No. 26, Jun. 29, 2004. (Cited in ISR).

International Search Report of PCT/GB2005/000676, date of mailing Apr. 18, 2006.

John E. P. Syka et al., "Peptide and protein sequence analysis by electron transfer dissociation mass spectrometry", PNAS, vol. 101, No. 26, Jun. 29, 2004, p. 9528-9533.

* cited by examiner

ION TRAP AND A METHOD FOR DISSOCIATING IONS IN AN ION TRAP

This invention relates to an ion trap and a method for dissociating ions in an ion trap, and relates especially to a quadrupole ion trap and to tandem mass analysis using a quadrupole ion trap.

Tandem mass analysis can be achieved by employing an ion trap analyser, which may be in the form of a magnetic cyclotron (FTICR MS) or a high frequency quadrupole ion trap. In a tandem mass spectrometer, a precursor ion with a certain mass to charge ratio is selected and is isolated inside the trapping volume. A dissociation procedure then follows using one of a number of known activation methods, including collision induced dissociation (CID), surface induced dissociation (SID), infrared multi-photon dissociation (IRMPD) and electron capture dissociation (ECD). The product ions resulting from this procedure are measured using a mass scan to obtain an $MS^2$ spectrum. If a further precursor ion is selected from the product ions and the dissociation procedure repeated the subsequent mass scan will give an $MS^3$ spectrum. Such a time domain procedure can be repeated to generate $MS^n$ spectra. The capability of a tandem mass spectrometer is very important, as $MS^n$ spectra allow for the elimination of chemical noise while, at the same time, increasing confidence in the identification of the chemical structure of the original ions by detecting and analysing specific product ions. This kind of tandem mass analysis is also efficient in elucidating and sequencing complicated molecular structures, such as protein and DNA.

Of the above dissociation methods, ECD was developed most recently and offers more extensive sequence information. For peptide and protein sequencing, ECD results in the backbone bond cleavage to form a series of c-type and z-type ions. This is in contrast to the commonly used CID which is only capable of cleaving the weak peptide bonds to form b-type and y-type ions resulting in loss of labile post-translational modification.

However, ECD has only been implemented using the FTICR mass spectrometer. While the quadrupole ion trap has been used for tandem mass analysis employing CID, and IRMPD to fragment protein or peptide ions, the quadrupole ion trap has not hitherto successfully incorporated ECD. It is likely that this is for the following reasons:

1. For ECD, the kinetic energy of electrons must be very low, typically around 0.2 eV. It is very difficult to transfer such low energy electrons from an electron source to the ion trapping region. In FTICR, where a strong magnetic field is employed a low energy thermo-emitted electron is always focused and is guided by the magnetic field lines until it reaches the trapping region. In the case of quadrupole ion trap, where a strong time-varying electric field is used to confine ions, the electric field will either accelerate or retard injected electrons. If a sinusoidal RF voltage is used to generate the trapping electric field, there is hardly any practical time window within which electrons can be injected and reach the centre of the ion trap with the required kinetic energy. Injected electrons are either accelerated to higher energies or simply ejected by the electric field. Fragmentation, due to these high-energy electron impacts masks the useful information obtained from ECD and it is very difficult to gate the injection of electrons to coincide with the narrow time window when the RF trapping voltage has the correct phase.

2. The mechanism of electron capture dissociation requires both the creation and preservation of the so-called Rydberg state of precursor ions according to current theoretical models of ECD. However, high electric fields within the quadrupole ion trap tend to destroy Rydberg states causing removal of electrons from the Rydberg orbit to a continuum. Even in the central region of the ion trap (the ion cloud may occupy a space over 2 mm in diameter) the field intensity may still cause a loss of the intermediate excitation state, with a consequent reduction in the efficiency of ECD.

3. It is common to use buffer gas in the ion trap to cause collisional cooling. The buffer gas pressure is normally at a pressure around $10^{-3}$ mbar and hundreds of collisions per millisecond will occur between the trapped ions and the buffer gas. Such collisions with the buffer gas in an ion trap can also destroy Rydberg states, which in turn reduces the efficiency of ECD.

Nevertheless, implementation of ECD in a quadrupole ion trap offers an attractive approach due to the fact that the quadrupole ion trap mass spectrometer is much cheaper to build compared with the FTICR instrument. U.S. Pat. No. 6,653,662 B2, Jochen Franzen discloses procedures for the implementation of ECD in a 3 D RF quadrupole ion trap. The method includes injecting electrons through an aperture in the ion trap electrode carrying the RF voltage, whereby the electron source is kept at the highest positive potential achieved at the centre of the ion trap during the RF cycle. With this method, electrons can reach the centre of the trap, interacting with the stored ions for a period of a few nanoseconds, while satisfying the low energy requirement of ECD. Although this method overcomes the first problem listed above, it results in a very narrow time window within which the electron beam can irradiate the trapped ions. It had been anticipated that the injected electrons would be captured by the potential well of the entire ion cloud and thereby survive and accumulate over successive RF cycles. However, such expectations have neither theoretical nor experimental support.

ECD is used to dissociate multiply-charged positive ions and is one example of electron induced dissociation. In another example of electron induced dissociation, electrons are injected into the ion trap to dissociate negative ions by so-called electron detachment dissociation.

According to one aspect of the invention there is provided a method for dissociating ions in an ion trap, comprising the steps of switching a trapping voltage between discrete voltage levels to create a digital trapping field for trapping precursor ions and product ions in a trapping region of the ion trap, and injecting electrons into said ion trap while the trapping voltage is at a selected said voltage level whereby injected electrons reach the trapping region with a kinetic energy suitable for electron induced dissociation to take place.

According to another aspect of the invention there is provided an ion trap including switch means for switching a trapping voltage between discrete voltage levels to create a digital trapping field for trapping precursor ions and product ions in a trapping region of the ion trap, a source of electrons and control means for causing source electrons to be injected into said ion trap while the trapping voltage is at a selected one of said voltage levels whereby the injected electrons reach the trapping region with a kinetic energy suitable for electron induced dissociation to take place.

The invention makes possible an extension of the time window within which low energy electrons can reach the ion cloud in the ion trap for effective ion electron interaction. The invention also makes it possible to reduce the electric field strength while maintaining ions in the trapping region during the dissociation process.

The pressure of buffer gas in the trapping region may be reduced to preserve the required intermediate state of ions during the ECD process.

In order to extend the time window for ECD, the conventional sinusoidal RF trapping waveform must be modified. GB 1346393 discloses a quadrupole mass spectrometer that is driven by a periodic rectangular or trapezoidal waveform. WO 0129875 further discloses a digital ion trap driving method, where the trapping field is driven by a voltage which switches between high and low voltage levels. This trapping method offers an opportunity for injecting electrons into the trapping region and allowing them to interact with the trapped ions.

In a preferred embodiment of the invention, the ion trap includes means for generating a magnetic field for guiding injected electrons to the trapping region.

Figure 2:
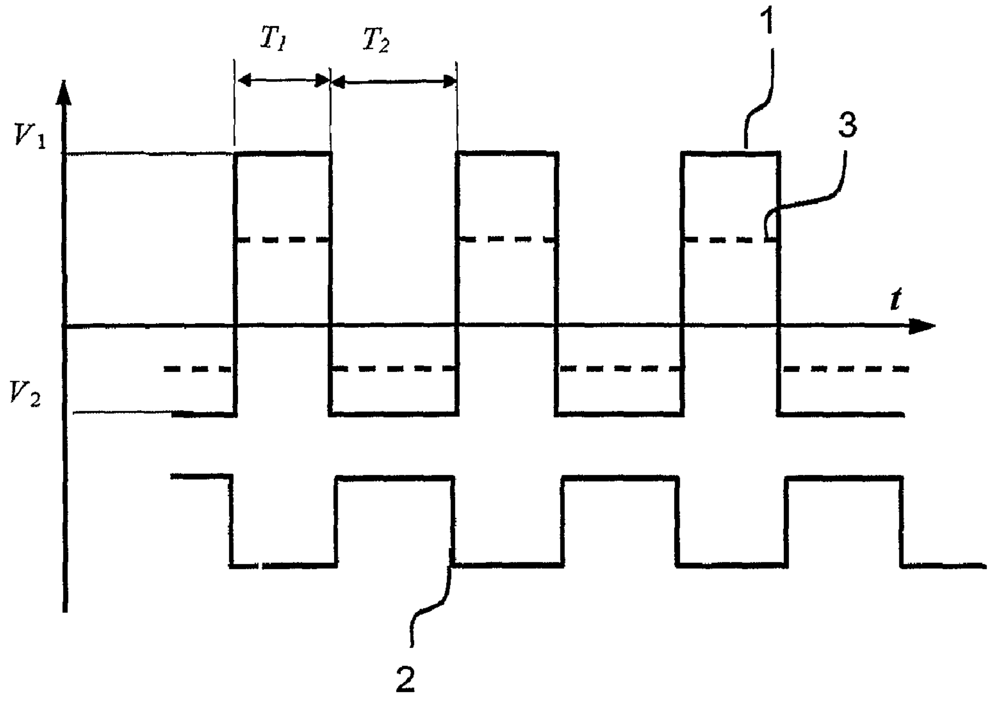
Figure 3:
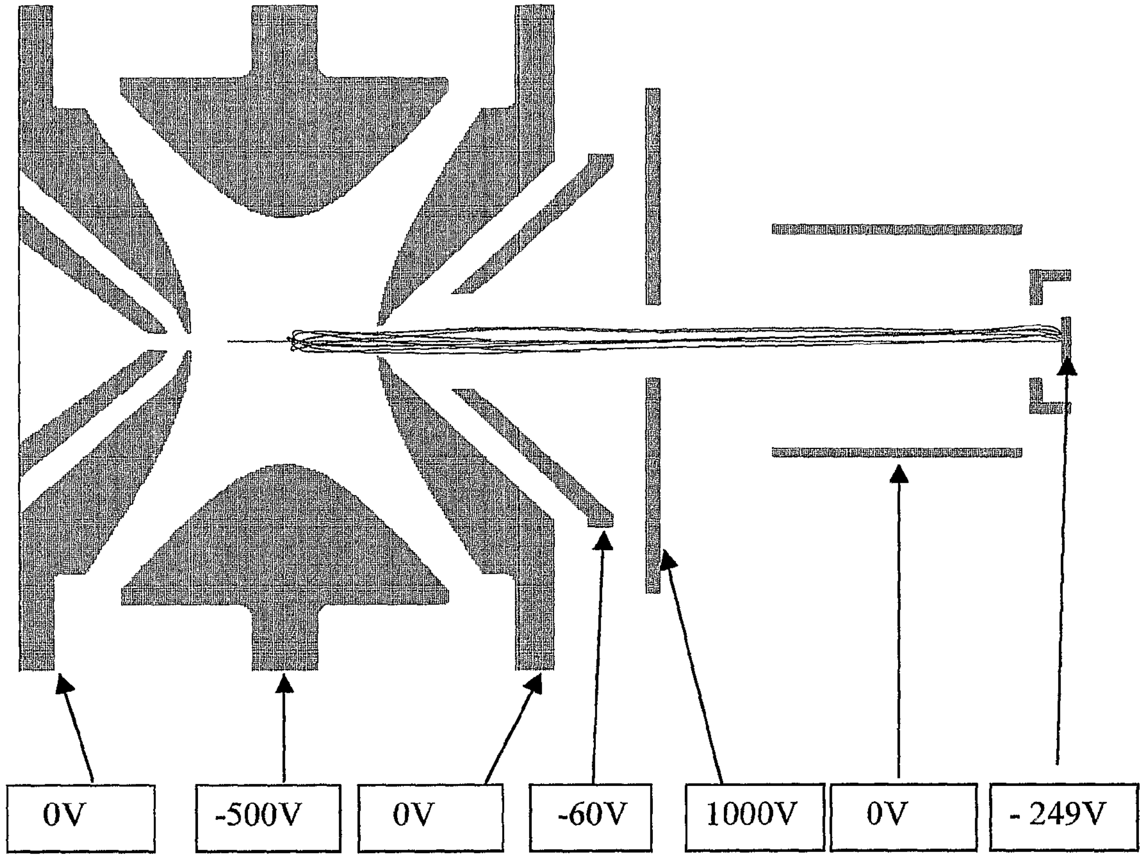
Figure 4:
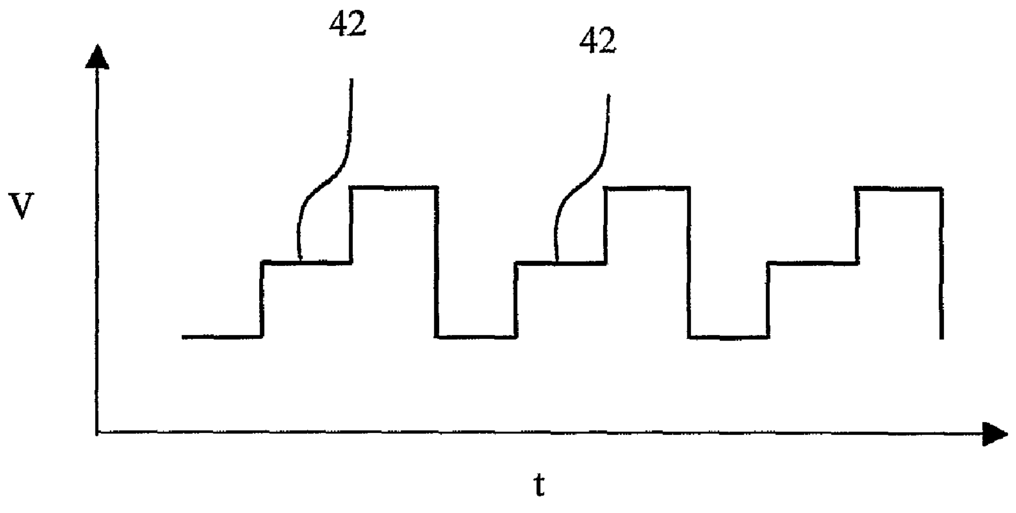
Figure 5:
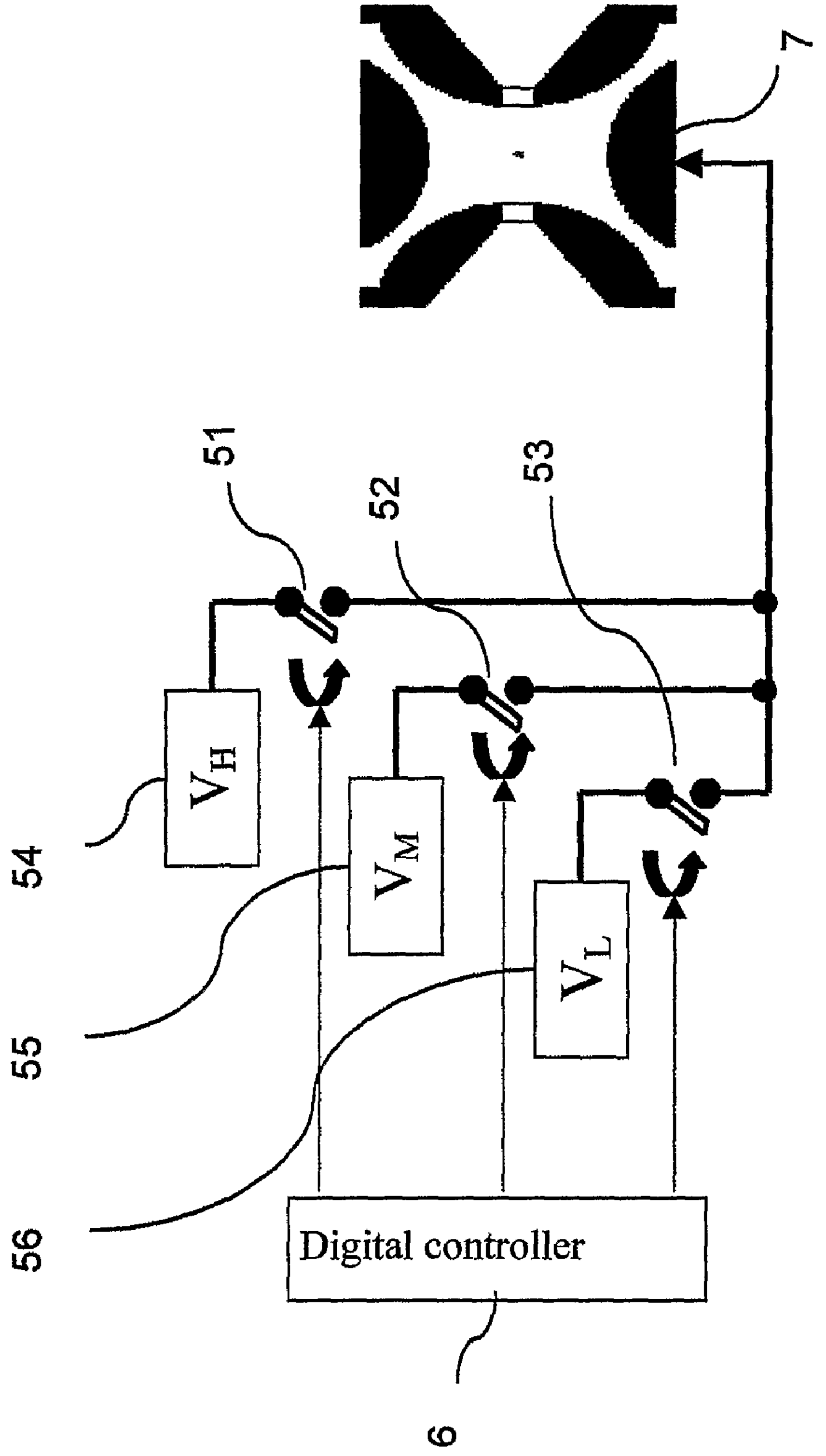

Embodiments of the invention are now described by way of example only, with reference to the accompanying drawings, of which:

FIG. 1 illustrates a quadrupole ion trap in which ECD can take place,

FIG. 2 shows the waveform (referenced 1) of the RF drive voltage applied to the ion trap and the waveform (referenced 2) of the pulsed gating voltage applied to an electron emitter during the ECD process, FIG. 3 is a simulation illustrating injection of electrons into a 3-D ion trap. The initial electron energy is 1 eV and is reduced to 0.2~0.7 eV upon reaching the central region of ion trap, FIG. 4 shows the waveform of an RF drive voltage having three discrete voltage levels, FIG. 5 shows a switching circuit for implementing the three-level drive voltage of FIG. 4, FIGS. 6(*a*) and 6(*b*) illustrate the application of magnetic field to assist electron injection. FIG. 6(*a*) shows the electron beam being injected with reduced energy through a hole in an end cap electrode and FIG. 6(*b*) shows the electron beam being introduced through a hole in the ring electrode.

Figure 7:
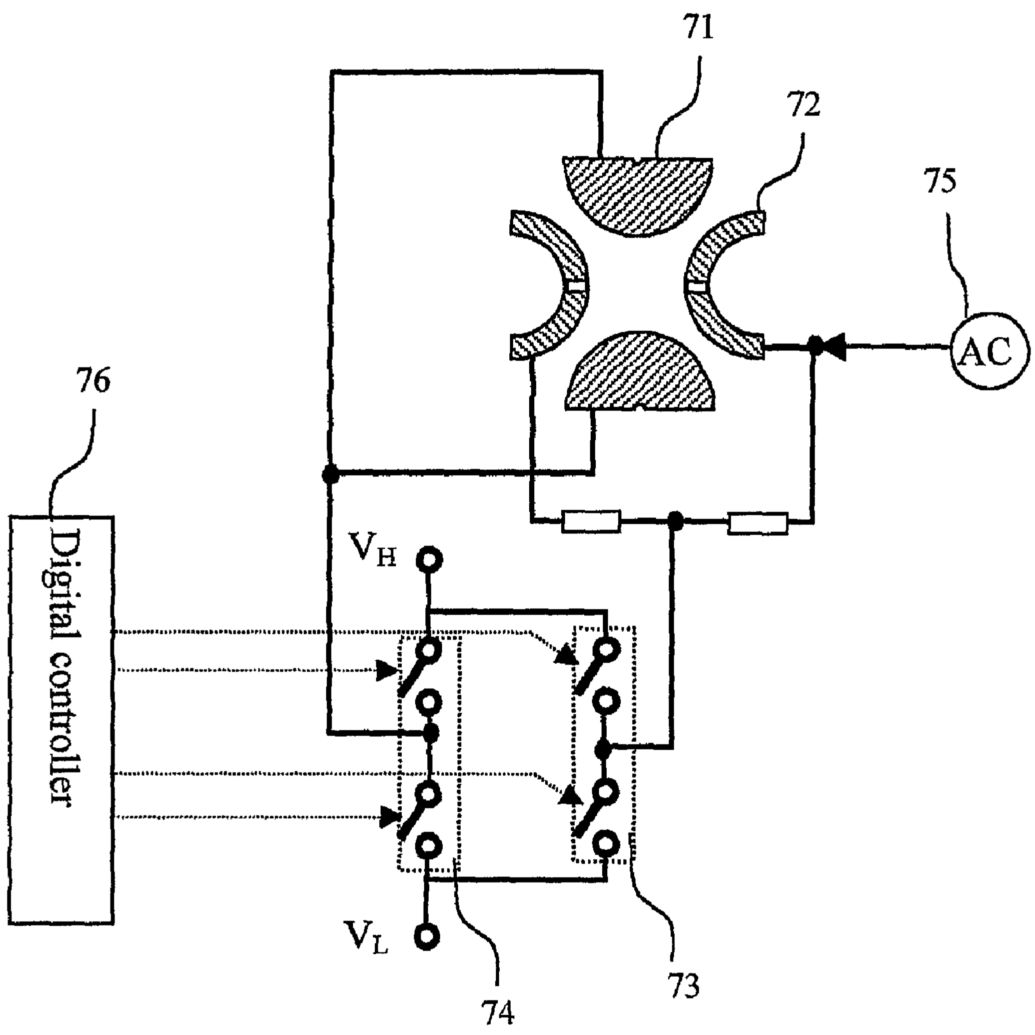
Figure 8:
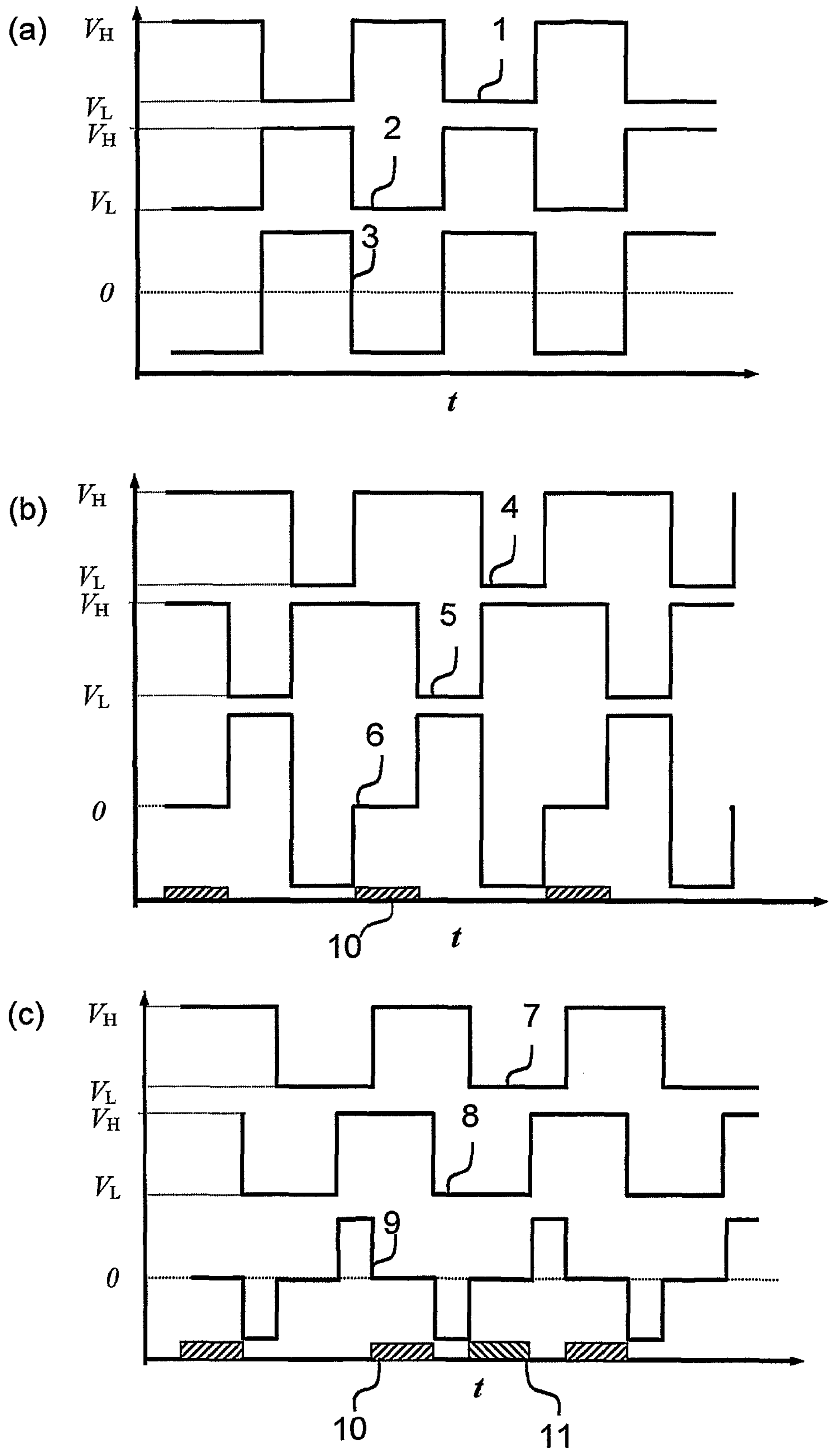

FIG. 7 illustrates a linear quadrupole ion trap in which ECD can take place, FIG. 8 illustrates waveforms of the RF drive voltage applied to X and Y electrodes of a linear ion trap, FIG. 9(*a*) illustrates an implementation of ECD in a linear quadrupole ion trap and FIG. 9(*b*) illustrates the variation of DC voltage along the axis of the linear quadrupole ion trap.

FIG. 1 of the accompanying drawings shows one implementation of the invention in which the ring electrode 7 of a 3-D ion trap is connected to a pair of switches 1, 2. The switches 1, 2 are electronic switches that are connected together in series as shown in FIG. 1. In this embodiment, switch 1 is connected to a high level DC power supply 4 and switch 2 is connected to a low level DC power supply 5. The switches are turned on and off alternately creating a rectangular waveform drive voltage which is applied to the ring electrode 7 of the quadrupole ion trap. The quadrupole ion trap has at least one hole in the ejection end cap electrode 8 through which ions can be ejected to an off-axis detector 10 via an extraction electrode 9. The off-axis detector comprises a conversion dynode 10*a* and an electron multiplier 10*b*. When the ECD process is activated, a high voltage bias on the detector 10 is switched off and an electron emitter 11 is turned on. A pulsed electron beam 15 is generated by controlling a pulsed gate voltage applied to gate 12. Waveform 1 of FIG. 2 shows the timing of the drive voltage applied to the ring electrode 7, whereas waveform 2 of FIG. 2 shows the timing of the pulsed gate voltage applied to gate electrode 12. The potential at centre of the ion trap where the trapped ions accumulate is also represented by the dashed line 3. Referring to FIG. 1, an electron beam 15 is produced when the voltage on ring electrode 7 undergoes a negative excursion, for example at −500 V. In the case of an ion trap for which $r_0=1.414z_0$, where $r_0$ is the radial dimension and $z_0$ is the axial dimension, as shown in FIG. 1, the potential at the centre of the ion trap is −250V. The electron emitter 11 is also biased with a voltage of −250V and electrons will be accelerated to 250 eV when they approach the hole in the end cap electrode 8, thereby making it easier to pass through the hole. After the electrodes have entered the ion trap they are retarded by the "static" quadrupole field. This is because electron motion is relatively fast compared with the microsecond time interval needed for one waveform excursion. Within nanoseconds, electrons reach the central region of the ion trap but have lost most of their kinetic energy and can be captured by a trapped multiply charged ion. FIG. 3 shows a simulation of 4 electrons injected into the ion trap in the above described manner. The electrons generated by the emitter 11 at −249V start with an initial kinetic energy of 1 eV and initial angles of up to 88 degrees (i.e. nearly all possible angles) with respect to the ion trap axis. The radius of the range of emission points is between 0 and 0.6 mm. Once the electrons have entered the ion trap they are strongly focused in the transverse directions.

It is easier to inject electrons through end cap electrode 8 than through the ring electrode 7. This is because in the latter case, electrons are not focused in all transverse directions i.e. only in the axial direction of the ion trap, but not in the direction perpendicular to the trap axis.

Application of a digital trapping voltage, as described, enables the time window within which ECD can take place to be extended, and so gating of the electron beam becomes relatively straightforward. Therefore there is no longer any requirement to inject electrons through the electrode to which the trapping voltage is applied, in order to prevent high energy electrons from reaching the trapping centre and hitting the ion cloud, as taught by U.S. Pat. No. 6,653,662. However, injection through ring electrode 7 may also have advantages as now explained.

Many prior art implementations demonstrate that ECD product ion intensity does not increase in proportion to the exposure time to electrons. Over-exposure causes decreased intensity of product signals with the parent ion peak being much higher than the peaks of the product ions. This is due to neutralization of product ions by subsequent capture of electrons. However, the product ions can be removed from the ion electron interaction region if an appropriate excitation waveform is applied. If electrons are injected through the ring electrode of a quadrupole ion trap, as mentioned above, the electrons are compressed in the z-direction and reach the ion cloud in the centre of the x-y plane. Ions can be selectively removed from this plane by applying a dipole tickling voltage across the end cap electrodes. When the mass-to-charge ratio of the precursor ions has been selected, a notch-filtered broad band excitation waveform can be readily created with the notch frequency assigned to the secular frequency of the precursor ion. When the excitation waveform is applied to the end cap electrodes, all ions except the precursor ions will be removed from the centre plane where electron irradiation occurs. By such means, the product ions produced by the ECD process will be removed from the centre of the ion trap and so protected from a cascading decay, and useful product ions may be accumulated.

An alternative way to avoid cascading decay, even when electrons are injected through a hole in an end electrode can be appreciated by examining FIG. 3. In the simulation of FIG. 3 for which the potential of the emitter is set at −249 V and the initial electron kinetic energy is 1 eV, the maximum electron kinetic energy (250 eV) is just enough for electrons to reach the centre of the ion trap. If the electron kinetic energy is set to a lower value, for example by making the electron emitter's potential less negative, electrons will start to turn around before reaching the centre of the ion trap. In this case, although the kinetic energy of electrons at the turning point is low enough for ECD to take place, the electron beam and the ion cloud do not overlap and so a reaction cannot take place. However, when a small dipole AC voltage is applied to the end cap electrodes, the precursor ions may be selectively excited. The ion cloud formed by the precursor ions will then expand along the z-axis and enter a region where it overlaps with the electron beam. This will provide an interaction region where both the ions and the electrons have favourably low energies for ECD to take place. The product ions will not be excited and will therefore cool down and so will move to the centre of the ion trap thereby avoiding further reaction with the electrons.

Each successive period selected for electron irradiation should preferably be at least as long as the period when there is no irradiation. This creates a relatively wide time window during which ECD can take place and also gives rise to a relatively low absolute trapping voltage value, since the average DC potential over the whole period is normally zero in order to provide the widest mass trapping range. When a lower trapping voltage is used during the ECD process, the better the chance to preserve the Rydberg state. Therefore, ECD efficiency can be improved when the rectangular waveform voltage is lower and a longer excursion of the waveform is chosen for ion electron interaction.

In order to further reduce the field strength for ECD to take place and yet, at the same time, maintain a sufficient trapping force, a 3 level digital waveform can be used. Such a waveform is shown in FIG. 4, and FIG. 5 illustrates a switching circuit which can be used to generate such a waveform. In this alternative embodiment, switch 51 is connected to a high level DC power supply 54 and switch 53 is connected to a low level DC power supply 56. An additional switch 52 is connected between a middle level DC power supply 55 and the junction of power supplies 54,56. The middle level DC power supply 55 may have a voltage in the range of 0 to −100V. When the three switches are turned on and off sequentially, the resultant output voltage will have a stepped waveform as shown in FIG. 4. The electron beam is activated and injected into the trap during each middle level excursion 42. Because of the very low electric field in the trapping region of the ion trap, the resultant intermediate state of excited ions will not be damaged before dissociation starts.

Unless there is a sufficient retarding field for reducing the energy of electrons in the trapping region, the electrons must be injected into the trapping region with very low kinetic energies in order that ECD can take place. Focusing a low energy electron beam at the centre of the ion trap is very difficult, with the result that many electrons may not reach the centre of the ion trap where interaction with the trapped ions takes place.

Figure 6A:
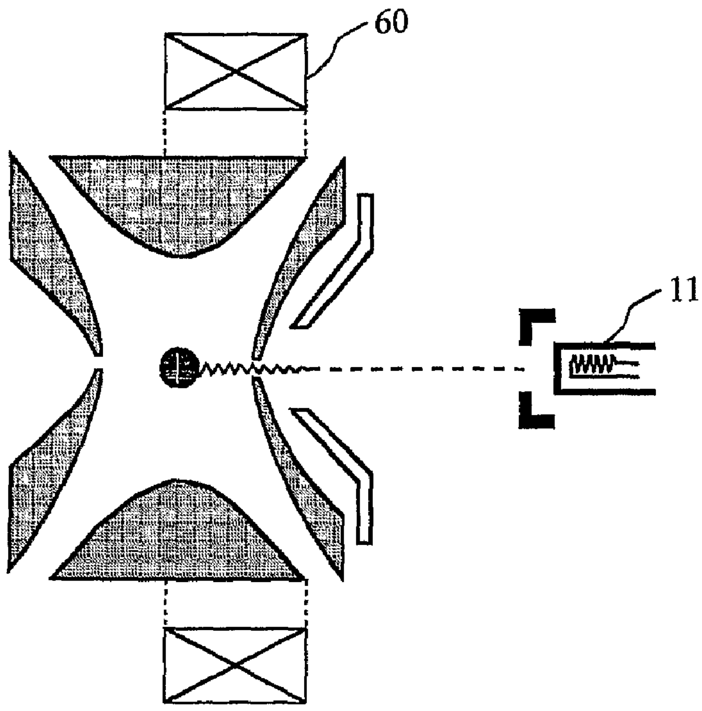

With a view to alleviating this problem, a magnetic field is applied to the ion trapping region. Calculation shows that a magnetic field of less than 150 Gauss will be sufficient to confine an electron beam generated by a thermo cathode to a beam within 1 mm diameter. This easily enables the electron beam to overlap and interact with the ion cloud in the ion trap. As shown in FIG. 6*a*, the magnetic field can be generated by a coil 60 surrounding the ion trap. The product of the number of turns and current is about 2000 A. The resultant magnetic field intensity has a negligible effect on ion trapping and can be switched off during precursor isolation and mass scanning.

Figure 6B:
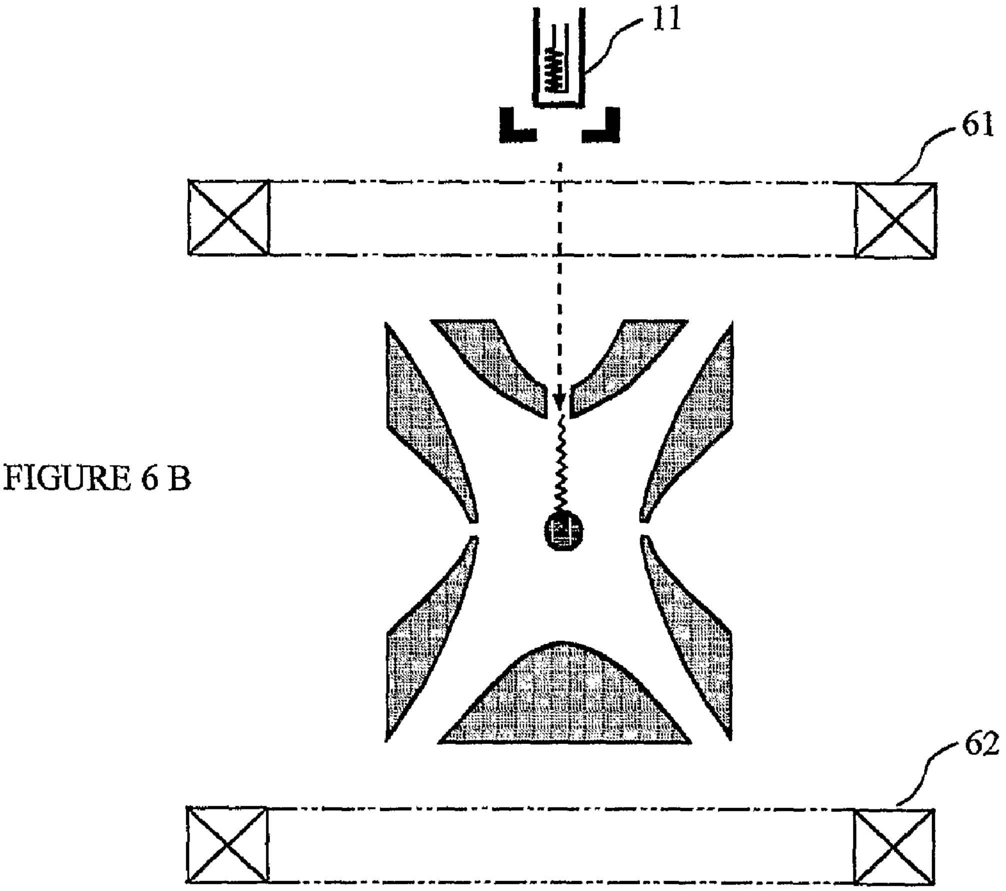

A magnetic field may also be used to focus an electron beam injected through a hole in the ring electrode. By this means, divergence in the x-direction at the centre of the x-y plane can be reduced and efficiency of ECD increased. FIG. 6*b* shows an arrangement for creating a magnetic field of this kind. As shown, Helmholtz type coils 61 and 62 may be used to generate the magnetic field within the ion trapping region.

A linear quadrupole ion trap may also be driven by a switching circuit and this has been disclosed in WO0129875. As in the case of a 3-D ion trap, a digitally driven linear ion trap also opens up the opportunity for ECD to take place. One of the ways to drive the linear ion trap is shown in FIG. 7. One pair of switches 73 is connected to the pair of X electrodes 72 and another pair of switches 74 is connected to the pair of Y electrodes 71. When the switch pairs 73, 74 operate alternately between a high voltage level $V_H$ and a low voltage level $V_L$, each outputs a rectangular waveform to the respective electrode pair 72, 71. An additional circuit 75 may be used to generate a dipole field within the trapping volume to cause resonance excitation of ions which is needed for mass selective isolation, CID and mass scanning. FIG. 8 shows three examples of a rectangular waveform applied to the X and Y electrode pairs. In the first example, (a), the two rectangular wave voltages 1 and 2 are in anti-phase. The resultant quadrupole field 3 created in the trapping volume also has a rectangular waveform. Under such conditions, ions can be trapped and selected using methods already disclosed in the prior art; however, an electron would be easily deflected if it travels along the axis of the linear ion trap. In the second and third examples, (b) and (c), the rectangular wave voltages applied to the X electrodes and Y electrodes are generated with relative phase shifts rather than in anti phase. This causes the electric field inside the trapping volume to have a stepped waveform 6 or 9, which includes at least one zero field excursion. In configuration (b) the zero field excursion occurs only once during each period, when both X and Y electrodes are connected to the higher voltage level. In configuration (c) the zero field excursion occurs twice during each period, once when both the X and Y electrode pairs are connected to the higher voltage level, and once when both the X and Y electrode pairs are connected to the lower voltage level. During the zero field excursion, electrons with very low kinetic energy may travel along the axis without acceleration or deflection in the X or Y direction. With the assistance of a magnetic field directed along the trap axis, the electron beam is expected to overlap with the ion cloud enabling ECD to take place. Configuration (b) may offer a larger ECD time window than configuration (c); however, the average potential on the trap axis is no longer zero volts since an asymmetric rectangular waveform is being used (duty cycle>0.5). This may cause some difficulties in designing the DC stopping potential at the two ends of the linear ion trap. With configuration (c) the average DC voltage is zero volts and so conventional methods for applying a DC stopping field can be used. The time interval when both pairs of electrodes are at the higher voltage level, as marked with a shadowed box 10 on the time axis, is preferred for the injection of the electron beam. This embodiment is depicted in brief in FIGS. 9*a* and 9*b*.

Figure 9A:
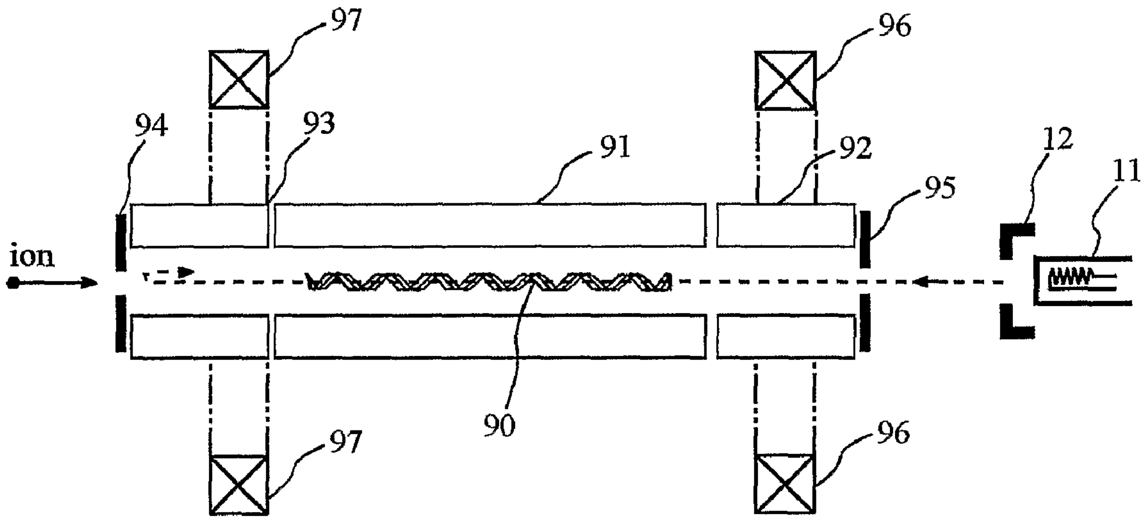
Figure 9B:
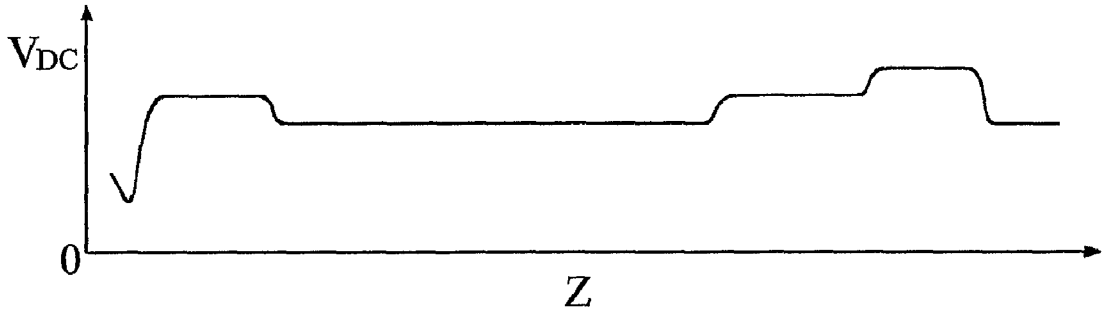

FIG. 9*a* is a schematic diagram showing a linear ion trap in combination with an electron source for ECD. In this configuration, the linear ion trap has a front segment 93, a main segment 91 and a back segment 92. Ions can be introduced via a gate 94 and the front segment 93 where they enter the main segment 91 and finally form a linear ion cloud 90. FIG. 9*b* shows the DC potential along the axis of the ion trap at the moment of electron injection, and this corresponds to interval 10 in FIGS. 8*b* and 8*c*. During these excursions, electrons from source 11 are injected from the right hand end entrance 95 and enter the trap segments 92, 91 and 93. At the left hand end, electrons will be reflected and will re-enter the interaction region. Since the electrons are expected to travel along the trap axis within the trapping volume with a very low energy, a magnetic field is used to guide the electron beam. This magnetic field is generated by a pair of Helmholtz coils 96 and 97. The position of the coils must be adjusted to align the magnetic field so as to be parallel to the axis of the linear ion trap. As mentioned above for a 3-D ion trap, an AC dipole field can be used to separate the precursor ions from the product ions to prevent the product ions from overlapping the electron beam. This will prevent cascading neutralization of the product ions thereby improving ECD efficiency.

A pulsed gas injection is needed to cool down the ion motion before ECD takes place. Buffer gas, having a constant high pressure, may reduce the efficiency of ECD so it is not recommended. The timing of a pulsed valve which introduces buffer gas into the trapping region must be synchronised with the ECD timings (waveform changing, electron gating and coil charging) to allow sufficient pumping out time before ECD starts.

In the case of a linear ion trap, substantial damping of the kinetic energy of ions may take place in one linear ion trap having a relatively high gas pressure, while ECD may take place in another, down stream linear ion trap where the gas pressure is lower. An orifice between the two ion traps may be used to maintain the pressure differential.

Although we describe electron injection during application of one selected voltage level of the digital trapping waveform, it is not necessary that ECD takes place only during that part of the waveform excursion. With the help of the magnetic field the injected low kinetic energy electrons may be trapped during the consecutive waveform excursion and may continue to react with the precursor ions. For a 3-D ion trap, such an opportunity exists when the voltage level 42 in FIG. 4 is used for the injection of low kinetic energy electrons. When the voltage on the ring electrode steps up to the next level, the electrons are trapped in the z-axis direction by the electric field and in the radial direction by the magnetic field. Such an opportunity also exists for a linear ion trap if electrons are injected during an excursion, such as depicted by the shaded region 11 in FIG. 8 (*c*), just before the transition that increases the axial potential of the linear ion trap.

In an alternative embodiment of the invention, instead of direct electron capture dissociation (ECD), dissociation using low kinetic energy electrons may involve a two stage process in which electrons are first captured by molecules of a gas in an ion trapping region of the ion trap and electrons are then transferred to the precursor ions to cause the dissociation.

The methods disclosed here are only examples. Various configurations can be designed to carry our ECD with a 3-D or a linear ion trap driven by a digital trapping voltage. For example, the electron source may be arranged off-axis, or may be designed to have a ring or hollow shape, enabling a laser beam to impinge on the ion cloud, as may be needed for other ionisation or dissociation purposes. The ion trap incorporating ECD according to the invention may be a stand alone mass spectrometer or may form part of a tandem mass spectrometer, such as in an ion trap—time of flight hybrid system.

The invention claimed is:

1. A method for dissociating ions in a 3-D quadrupole ion trap composed of a ring electrode and a pair of end cap electrodes placed across the ring electrode, comprising the steps of switching a trapping voltage between two discrete DC voltage levels to form rectangular waveforms and to create a digital trapping field for trapping precursor ions and product ions in a trapping region of the ion trap, and injecting electrons through a hole in one of the end cap electrodes into said ion trap while the trapping voltage is at a selected one of said two discrete DC voltage levels to maintain the ion trapping conditions while the electrons are injected into the ion trap whereby injected electrons reach the trapping region with a kinetic energy suitable for electron induced dissociation to take place.

2. A method as claimed in claim 1 wherein the initial kinetic energy of the injected electrons is reduced to said kinetic energy suitable for electron induced dissociation to take place after the electrons have entered the ion trap.

3. A method as claimed in claim 1 wherein the electrons have a relatively low initial kinetic energy substantially suitable for electron induced dissociation, and are injected into said trapping region while the trapping voltage is at or close to zero volts.

4. A method as claimed in claim 1 including using a magnetic field to guide injected electrons to the trapping region.

5. A method as claimed in claim 4 wherein said magnetic field is generated using an electrical coil arranged to be energised by a pulsed current.

6. A method as claimed in claim 1 including introducing pulses of gas into the trapping region of the ion trap to cause collisional cooling of ions prior to or after dissociation.

7. A method as claimed in claim 6 wherein said pulses of gas are introduced into the trapping region using a pulsed valve and a vacuum pump capable of rapidly reducing the gas pressure to below $10^{-4}$ bar.

8. A method as claimed in claim 1 including applying a pulsed gate voltage to gating means to control extraction of electrons from an electron source for injection into said trapping region and synchronising application of said pulsed gate voltage with the step of switching said trapping voltage to said selected voltage level.

9. A method as claimed in claim 1 including applying a broadband dipole signal to the ion trap to remove product from the central region of the ion trap.

10. A method as claimed in claim 1 including applying an AC dipole signal to the ion trap to selectively excite the precursor ions.

11. A method as claimed in claim 1 wherein the trapped precursor ions include multiply-charged precursor ions, and the injected electrons have a kinetic energy less than 1 eV and are capable of inducing electron capture dissociation of said multiply-charged ions.

12. A method as claimed in claim 1 wherein the trapped precursor ions include multiply-charged precursor ions and including the step of introducing a gas into the trapping region of the ion trap whereby the injected electrons are captured by molecules of the gas and electrons are then transferred to the precursor ions to cause the dissociation.

13. A method for dissociating ions in a 3-D quadrupole ion trap composed of a ring electrode and a pair of end cap electrodes placed across the ring electrode, comprising the steps of switching a trapping voltage between two discrete DC voltage levels to form rectangular waveforms and to create a digital trapping field for trapping precursor ions and product ions in a trapping region of the ion trap, and injecting electrons through a hole or slit in the ring electrode of the ion trap into said ion trap while the trapping voltage is at a selected one of said two discrete DC voltage levels to maintain the ion trapping conditions while the electrons are injected into the ion trap whereby injected electrons reach the trapping region with a kinetic energy suitable for electron induced dissociation to take place.

14. A 3-D quadrupole ion trap composed of a ring electrode and a pair of end cap electrodes across the ring electrode, including switch means for switching a trapping voltage between two discrete DC voltage levels to form rectangular waveforms and to create a digital trapping field for trapping precursor ions and product ions in a trapping region of the ion trap, a source of electrons and control means for causing source electrons to be injected through a hole in the end cap electrode into said ion trap while the trapping voltage is at a selected one of said voltage levels to maintain the ion trapping conditions while the electrons are injected into the ion trap, whereby the injected electrons reach the trapping region with a kinetic energy suitable for electron induced dissociation to take place.

15. An ion trap as claimed in claim 14 wherein said electrons have a relatively low initial kinetic energy substantially suitable for electron induced dissociation to take place and the electrons are injected into said trapping region while the trapping voltage is at or close to zero volts.

16. An ion trap as claimed in claim 15 wherein said switch means is arranged to switch said trapping voltage between three discrete voltage levels and said control means is arranged to cause injection of said electrons into the trapping region while the trapping voltage has the lowest absolute voltage value.

17. An ion trap as claimed in claim 14 including means for generating a magnetic field for guiding injected electrons to the trapping region.

18. An ion trap as claimed in claim 17 wherein said means for generating a magnetic field comprises an electrical coil and means for energising the coil with pulsed current.

19. An ion trap according to claim 14 including a gas source for introducing pulses of gas into the trapping region to cause collisional cooling of ions prior to or after dissociation.

20. An ion trap as claimed in claim 19 wherein the gas source includes a pulsed valve and a vacuum pump capable of rapidly reducing gas pressure to below $10^{-4}$ bar.

21. An ion trap as claimed in claim 14 wherein said control means includes gating means, means for applying a pulsed gate voltage to said gating means to control extraction of electrons from a said source of electrons, and means for synchronising application of said pulsed gate voltage with the switching of said trapping voltage to the selected voltage level.

22. An ion trap as claimed in claim 14 including means for applying a broadband dipole signal to the ion trap to remove product ions from the central region of the ion trap.

23. A 3-D quadrupole composed of a ring electrode and a pair of end cap electrodes across the ring electrode, including switch means for switching a trapping voltage between two discrete DC voltage levels to form rectangular waveforms and to create a digital trapping field for trapping precursor ions and product ions in a trapping region of the ion trap, a source of electrons and control means for causing source electrons to be injected through a hole or slit in the ring electrode of the ion trap into said ion trap while the trapping voltage is at a selected one of said voltage levels to maintain the ion trapping conditions while the electrons are injected into the ion trap, whereby the injected electrons reach the trapping region with a kinetic energy suitable for electron induced dissociation to take place.

* * * * *